July 7, 1959 A. F. CLARKE, JR 2,894,177

VACUUM TUBE MOUNTING

Filed July 23, 1953

INVENTOR

ARTHUR F. CLARKE, JR.

BY

ATTORNEY

United States Patent Office 2,894,177

Patented July 7, 1959

2,894,177

VACUUM TUBE MOUNTING

Arthur Francis Clarke, Jr., Cedar Grove, N.J., assignor to Bendix Aviation Corporation, Teterboro, N.J., a corporation of Delaware Application July 23, 1953, Serial No. 369,929

10 Claims. (Cl. 317—101)

Figure 1:
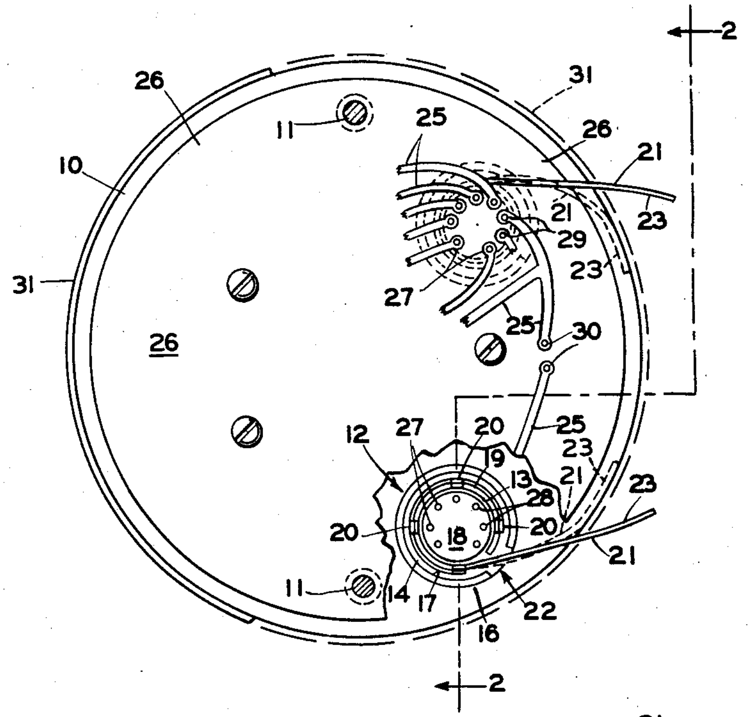

This invention relates to vacuum tube mountings, and is particularly directed to a mounting arrangement suitable for enclosed spaces of limited extent.

The invention is especially applicable to instrument casings which enclose electrical apparatus and the components of associated tube circuits. Such units, exemplified by the instruments installed in aircraft, are very small and compact, yet must be reliable and efficient. They are commonly constructed with an outer casing of metal, usually cylindrical for convenient insertion in standard instrument panel openings, and may be provided with transverse partitions on which the components are mounted.

In such locations a principal problem is the dissipation of heat generated by vacuum tubes. A purpose of the invention is to provide a practical, compact and simple mounting that includes an improved arrangement for heat dissipation. This is in general accomplished by providing a metal casing for the tube which has a heat-conducting projection arranged for heat-transmitting contact with other metal elements, which thereby assist in heat dissipation. In the preferred form, this projection is constituted by a fin of resilient sheet metal, which advantageously is arranged to have a substantial area bearing against the metal casing, providing efficient heat dissipation. In this form the tube may be mounted with the fin extending beyond the location of the casing; and by deflecting the fin inwardly as the casing is slid endwise into place, firm resilient facewise engagement between the fin and the casing is obtained. A plurality of tube mountings of this type may readily be installed in the same casing.

Another general purpose is to provide a novel mounting for vacuum tubes especially suited for use in the limited spaces already indicated. It is particularly effective for smaller tubes, of the type known as sub-miniatures, which are desirable for this type of installation. A feature of this mounting is the provision of a novel connection between such tubes and a printed circuit, an arrangement which is especially economical of space.

This is accomplished by placing the tubes in upright position on the sheet of insulation which carries the printed circuit, in which position the leads from the tube can be readily and efficiently connected to the proper portions of the circuit. A specific feature includes a connection of this type in which the leads are passed through openings in the sheet and in the appropriate parts of the printed circuit, so that the leads and circuit elements may be effectively connected by soldering. In particular, an arrangement is disclosed which permits the use of the very rapid and efficient dip-soldering method by which all of the leads of the tube, as well as leads of other circuit elements, may be simultaneously and very rapidly soldered in place by a single operation.

An additional feature is the combination of this type of mounting of a sub-miniature tube on a sheet carrying a printed circuit, with the use of a tube-supporting heat-radiating casing of the type heretofore described, which is particularly suited for holding a tube in place without any strain on the connections between the tube leads and the circuit elements, as well as providing the support and heat dissipation which are particularly required with tubes mounted in this manner. This combination is also especially advantageous for use in instrument assemblies of the indicated type, since the tube casings may readily be mounted on transverse partitions of standard type, and the circuit-carrying sheet may be conveniently carried by such partition. This combination is therefore especially effective for efficient assembly and operation in the very limited space available in electrical instrument casings.

Another object of the invention is to provide a tube mounting and supporting structure that can be readily manufactured and assembled from ordinary materials by standard mass production methods, an important requirement in this highly competitive field.

These and other objects and advantages of the invention will appear more fully from a consideration of the detailed description which follows, in conjunction with the accompanying drawing in which one embodiment of the invention is illustrated. It is to be expressly understood, however, that the drawing is for the purpose of illustration and description and is not to be construed as defining the limits of the invention.

Referring now to the drawing for a more detailed description of an embodiment of the invention.

Figure 2:
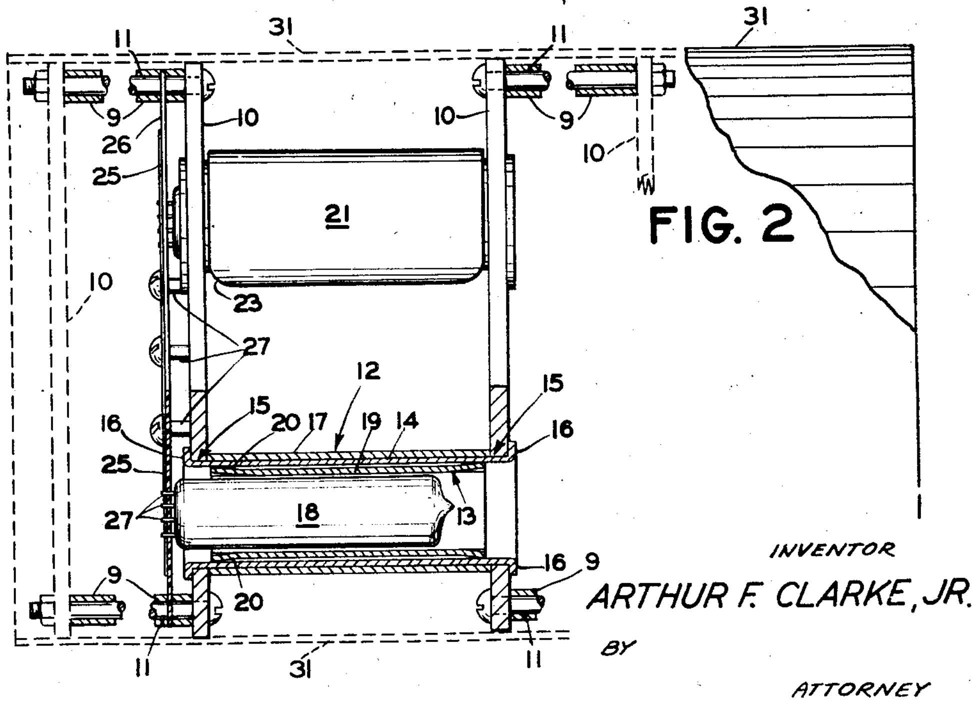

Fig. 1 is a face view of a transverse section of an electrical instrument assembly in a cylindrical casing, with parts broken away, and Fig. 2 is a side elevation thereof with the lower part shown in section on line 2—2 of Fig. 1.

The illustrated embodiment is mounted as part of a cylindrical electrical instrument assembly which includes circular transverse partitions 10 held in place by spacers 9 and spacing bolts 11. The tube mounting includes an outer casing 12 and an inner casing 13 of generally cylindrical form. The outer casing 12 is mounted at its ends on partitions 10. In the form illustrated such outer casing includes inner tube 14 extending through openings 15 in partitions 10, with its outer ends bent outwardly to form flanges 16 engaging the partitions 10. The outer tube 17 of casing 12 overlies tube 14 and butts at its ends against the inner faces of partitions 10, so that the outer casing 12 in effect constitutes a support and spacer for two of said partitions.

The inner casing 13 is proportioned to fit snugly around vacuum tube 18 and within the outer casing 12. Said inner casing consists of a cylindrical portion 19, which may be provided at its ends with a plurality of spring fingers 20 struck up from the metal of which the tube is composed and bent outwardly to engage the outer casing 12, preventing any movement of the inner casing 13 and providing a resilient housing for tube 18. The cylindrical portion 19 is provided with an integral fin 21 which extends through a longitudinal slot 22 in the outer casing 12 and is positioned so that when the casing 31 is removed, the fin 21 projects at an angle beyond the outer margins of partitions 10, the outer portion 23 of the fin being advantageously curved to conform to the inner contour of the casing as hereafter indicated.

The inner casing 13 is designed so that it may be readily stamped out of a sheet of metal in one operation and thereafter bent to the required form. It is constructed of metal, and in its final condition is sufficiently resilient to maintain strong pressure in the area of contact with the casing, Phosphor bronze having been found to be a suitable material for this purpose.

The tube 18 is suitably connected at its base to the tube circuit leads; and in the form illustrated this is accomplished by mounting the tube on an insulating base arranged to permit proper positioning of the tube in the casing structure already described; and the base advantageously includes a sheet of insulating material 26 on which a circuit is printed. In the form illustrated the printed circuit 25 is printed on the sheet of insulation 26 supported by mounting studs 27 on a partition 10. Tube 18 is located in casing 13 with its base against the adjacent face of sheet 26 and its leads 27 extending through holes 28 in said sheet and connection apertures 29 formed in terminal portions of the printed circuit 25 surrounding said holes 28, leads 27 being connected to said circuit across apertures 29, as by soldering, to provide both electrical connections and support for tube 18.

The described type of construction is particularly adapted for rapid and efficient assembly and mounting. After the circuit 25 is printed on sheet 26 and the necessary openings 28 for leads 27 are pierced through the sheet 26, the tubes 18 are placed in position with their leads extending through such openings; and of course other circuit elements such as condensers and resistors may be similarly mounted, one pair of connection terminal apertures 30 for this purpose being illustrated. All leads of such tubes and other circuit components may be efficiently and simultaneously soldered to the contiguous portions of the circuit by the dip-soldering method, since the solder in which the sheet and connected elements are dipped will adhere only to the leads and adjacent parts of the metallic printed circuit, and will drain off the remainder of the sheet 26 when the latter is lifted from the solder.

The sheet of insulation 26 may then be placed in position with the tubes 18 inserted through apertures 15 in partition 10 into inner casings 13. Partitions 10 of course will carry numerous other elements, and the entire structure can readily be assembled, as by means of mounting bolts 11, in position for enclosure by a single cylindrical casing 31, whose location is indicated, partially in dotted lines. The casing 31 is slid lengthwise over partitions 10 while fins 21 are pressed inwardly to clear the casing; and when the fins are released they will bear strongly against the inner casing surface as indicated in dotted lines, providing a large area of contact for heat transfer due to the curvature of the outer portion 23 of said fins, which conforms to the curvature of casing 31. Since the casing 31 is constructed of metal, this construction will provide a large area for heat dissipation; and tubes 18 will therefore to kept adequately cool even with continuous operation while fully enclosed.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art. While the invention has been described as applicable to vacuum tubes it should be understood that the invention may be used with other electronic components, such as transistors.

I claim:

1. A mounting for an electronic component, comprising a metal enclosure, a support located within said enclosure, and a metal casing for the component mounted on the support and including a heat conducting projection extending into position for heat transferring contact with the enclosure said contact defining an area substantially larger than the cross-sectional area of the conducting projection to facilitate the transfer of heat by conduction to the enclosure.

2. A mounting for an electronic component, comprising a metal enclosure, a support located within said enclosure, and a metal casing for the component mounted on the support and including a resilient heat conducting fin extending, when unstressed, beyond the location of the enclosure and arranged to bear against the enclosure with spring pressure in an area substantially larger than the cross-sectional area of the fin for the transfer of heat by conduction to the enclosure when the enclosure is in position.

3. A mounting for an electronic component, comprising a metal enclosure, a support located within said enclosure, and a tube casing including a cylindrical sheet metal portion fitting around the component and an integral resilient sheet metal fin extending outwardly into position for heat transferring biased surface contact with the enclosure said contact defining an area substantially larger than the cross-sectional area of the fin to facilitate the transfer of heat by conduction to the enclosure.

4. A mounting for a vacuum tube, comprising a metal enclosure, a support located within said enclosure, an outer cylindrical tube casing mounted on the support and having a longitudinal slot, and an inner cylindrical sheet metal casing supported by said outer casing and fitting around the tube and having an integral resilient sheet metal fin extending outwardly through the slot into position for heat transferring biased surface contact with the enclosure.

5. A mounting for a vacuum tube, comprising a metal enclosure, a support located within said enclosure, an outer cylindrical tube casing mounted on the support and having a longitudinal slot, and an inner cylindrical sheet metal casing supported by said outer casing and fitting around the tube and having an integral resilient sheet metal fin extending outwardly through the slot into position for heat transferring biased contact with the enclosure, said support having an opening in line with said inner cylindrical casing arranged for introduction of the tube through the support into said casing.

6. A mounting for a vacuum tube, comprising a cylindrical outer casing having a longitudinal slot and an inner casing of sheet metal supported by said outer casing and having a cylindrical substantially tube-enclosing portion located within the outer casing and an integral heat discharging fin projecting outwardly through the slot.

7. A mounting for a vacuum tube, comprising a cylindrical outer casing having a longitudinal slot, a sheet metal inner casing supported by said outer casing and having a cylindrical substantially tube-enclosing portion within the outer casing, resilient members on the cylindrical portion bearing outwardly against the outer casing, and an integral heat discharging fin projecting outwardly through the slot.

8. A mounting for a vacuum tube located within a metal enclosure, comprising two transverse partitions within the enclosure, an outer cylindrical tube casing mounted at its ends on the partitions and having a longitudinal slot, and an inner cylindrical sheet metal casing supported by said outer casing and fitting around the tube and having an integral resilient sheet metal fin extending outwardly through the slot and between the partitions into position for heat transferring biased surface contact with the enclosure.

9. In combination, a vacuum tube mounting located within a metal enclosure, including two transverse partitions within the enclosure, an outer cylindrical tube casing mounted at its ends on the partitions and having a longitudinal slot, an inner cylindrical sheet metal casing having an integral resilient sheet metal fin extending outwardly between the partitions and through the slot into position for heat transferring biased surface contact with the enclosure, a sheet of insulating material mounted on a partition at the opposite side from the casings, printed conductors on the sheet including tube terminals, a vacuum tube, including projecting leads, mounted on the sheet, and tube supporting connections between the tube leads and said terminals, said tube extending through an opening in the adjacent partition into said inner casing.

10. A mounting for an electronic component, comprising an enclosure of heat conducting material, a support located within the enclosure, an outer casing mounted on the support and having a longitudinal slot, and an inner casing of heat conducting material supported by the outer casing and fitting around the component and having an integral resilient fin extending outwardly through the slot into position for heat transferring biased surface contact with the enclosure.

References Cited in the file of this patent

UNITED STATES PATENTS

| | | |
|---|---|---|
| 1,616,721 | Vallin | Feb. 8, 1927 |
| 1,758,775 | Abbott | May 13, 1930 |
| 1,939,130 | Mills | Dec. 12, 1933 |
| 1,960,058 | Lynn | May 22, 1934 |
| 2,061,427 | King | Nov. 17, 1936 |
| 2,066,876 | Carpenter et al. | Jan. 5, 1937 |
| 2,176,657 | Finch | Oct. 17, 1939 |
| 2,270,166 | Hiensch et al. | Jan. 13, 1942 |
| 2,343,049 | Fassinger | Feb. 29, 1944 |
| 2,362,044 | Blancha | Nov. 7, 1944 |
| 2,454,018 | Wagstaff | Nov. 16, 1948 |
| 2,478,574 | Drake | Aug. 9, 1949 |
| 2,492,236 | Mydlil | Dec. 27, 1949 |
| 2,502,291 | Taylor | Mar. 28, 1950 |
| 2,575,601 | Staver | Nov. 20, 1951 |
| 2,595,188 | Del Camp | Apr. 29, 1952 |
| 2,673,721 | Dickinson | Mar. 30, 1954 |
| 2,718,623 | Yoder et al. | Sept. 20, 1955 |
| 2,807,659 | Woods | Sept. 24, 1957 |

OTHER REFERENCES

Tele-Tech, June 1952, pages 39, 40, 120.